(12) United States Patent
Reddin et al.

(10) Patent No.: US 9,098,325 B2
(45) Date of Patent: Aug. 4, 2015

(54) PERSISTENT VOLUME AT AN OFFSET OF A VIRTUAL BLOCK DEVICE OF A STORAGE SERVER

(75) Inventors: Timothy Reddin, Spiddal (IE); Liam Noel Kelleher, Oranmore (IE); Alistair Coles, Bath (GB); Aled Edwards, Charfield (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 746 days.

(21) Appl. No.: 13/407,050

(22) Filed: Feb. 28, 2012

(65) Prior Publication Data

US 2013/0227552 A1 Aug. 29, 2013

(51) Int. Cl.
G06F 12/00 (2006.01)
G06F 9/455 (2006.01)
G06F 9/50 (2006.01)

(52) U.S. Cl.
CPC .......... *G06F 9/45558* (2013.01); *G06F 9/5016* (2013.01); *G06F 2009/45579* (2013.01)

(58) Field of Classification Search
CPC .................................. G06F 12/00; G06F 3/06
USPC ........................... 711/100, 113, 114, 154, 200
See application file for complete search history.

(56) References Cited

U.S. PATENT DOCUMENTS

| | | |
|---|---|---|
| 6,745,207 B2 | 6/2004 | Reuter et al. |
| 6,934,799 B2 | 8/2005 | Acharya et al. |
| 7,689,803 B2 | 3/2010 | Karr et al. |
| 7,734,882 B2 | 6/2010 | Malkin |
| 8,046,446 B1 | 10/2011 | Karr et al. |
| 8,315,991 B2 | 11/2012 | Mandagere et al. |
| 2005/0228950 A1 | 10/2005 | Karr |
| 2005/0235132 A1 | 10/2005 | Karr et al. |
| 2006/0248285 A1* | 11/2006 | Petev ............................ 711/141 |
| 2009/0158432 A1* | 6/2009 | Zheng et al. .................... 726/24 |
| 2009/0307716 A1 | 12/2009 | Nevarez et al. |
| 2010/0125730 A1 | 5/2010 | Dodgson et al. |
| 2010/0169497 A1 | 7/2010 | Klimentiev et al. |
| 2010/0186014 A1 | 7/2010 | Vaghani et al. |
| 2010/0268764 A1 | 10/2010 | Wee et al. |
| 2010/0274772 A1 | 10/2010 | Samuels |
| 2011/0022812 A1* | 1/2011 | van der Linden et al. .... 711/163 |
| 2011/0119668 A1 | 5/2011 | Calder et al. |
| 2011/0154320 A1 | 6/2011 | Verma |
| 2011/0161291 A1 | 6/2011 | Taleck et al. |
| 2011/0161496 A1 | 6/2011 | Nicklin |
| 2011/0184963 A1 | 7/2011 | Singh Thakur et al. |
| 2011/0197039 A1* | 8/2011 | Green et al. .................. 711/162 |
| 2011/0264906 A1 | 10/2011 | Pourzandi et al. |
| 2011/0271062 A1 | 11/2011 | Chen |
| 2011/0289310 A1 | 11/2011 | Selgas et al. |

(Continued)

OTHER PUBLICATIONS

Ajay Gulati et al., "BASIL: Automated IO Load Balancing Across Storage Devices," USENIX Conference on File and Storage Technologies (FAST), Feb. 2010, available at: <http://labs.vmware.com/publications/basil>.

(Continued)

*Primary Examiner* — Tuan Thai
(74) *Attorney, Agent, or Firm* — Hewlett-Packard Patent Department

(57) ABSTRACT

Example embodiments disclosed herein relate to a persistent volume at an offset of a virtual block device of a storage server. Example embodiments include requesting that a persistent volume be dissociated from a virtual block device in response to the termination of a virtual machine.

15 Claims, 4 Drawing Sheets

(56) References Cited

U.S. PATENT DOCUMENTS

2013/0151802 A1   6/2013   Bahadure et al.
2013/0198738 A1   8/2013   Reddin et al.

OTHER PUBLICATIONS

Huawei Technologies Co., Ltd., "Brain of the Virtualized Data Center—Network Virtual Machine-aware Solution," retrieved from: <http://www.huawei.com/enterprise/catalog.do?id=16407>, retrieved on Feb 2, 2012; available at: <http://enterprise.huawei.com/en/enterprise/catalog.do?id=16407>.

J. Satran et al., "Internet Small Computer Systems Interface (iSCSI)," Network Working Group, Request for Comments: 3720, Apr. 2004, available at: <http://tools.ietf.org/pdf/rfc3720.pdf>.

Dai Jiazhu et al., "A PKI-based Mechanism for Secure and Efficient Access to Outsourced Data," 2nd International Conference on Networking and Digital Society (ICNDS), May 30-31, 2010, pp. 640-643.

Kalman Meth et al., "Features of the iSCSI Protocol," IEEE Communications Magazine, Aug. 2003, pp. 72-75, available at: <http://dslab.ee.ncku.edu.tw/~labyrinth/research/paper/Features%20of%20the%20iSCSI%20protocol.pdf>.

Shai Harmelin et al., "Isilon IQ and VMware vSphere 4.1: Best Practices for VMware vSphere Using Isilon IQ Scale-out Storage," Isilon Systems, Feb. 2011, Available at: <http://www.isilon.com/filehandler-show//1517/library-best-practices-guide-vmware-vsphere-0.pdf>.

T Wu, "The SRP Authentication and Key Exchange System," Network Working Group, Request for Comments: 2945, Sep. 2000, available at: <http://www.ietf.org/rfc/rfc2945.txt>.

VMWare, Inc., "Virtualized iSCSI SANs: Flexible, Scalable Enterprise Storage for Virtual Infrastructures," VMware White Paper, Mar. 2008, Available at: <http://www.vmware.com/files/pdf/partners/dell-eql-iscsi-sans-wp.pdf>.

W. Simpson, "PPP Challenge Handshake Authentication Protocol (CHAP)," Network Working Group, Request for Comments: 1994, Aug. 1996, available at: <http://tools.ietf.org/pdf/rfc1994.pdf>.

Non-Final Office Action, U.S. Appl. No. 13/360,956, Date Issued: Nov. 7, 2014, pp. 1-12.

\* cited by examiner

PERSISTENT VOLUME AT AN OFFSET OF A VIRTUAL BLOCK DEVICE OF A STORAGE SERVER

BACKGROUND

In computing systems, storage for a computing device may be provided locally or remotely. For example, a client server may access remote storage managed by a separate storage server. In such examples, the storage server may manage a plurality of storage devices, and the client server may utilize the storage devices by communicating with the storage server.

BRIEF DESCRIPTION OF THE DRAWINGS

The following detailed description references the drawings, wherein.

DETAILED DESCRIPTION

Figure 1:
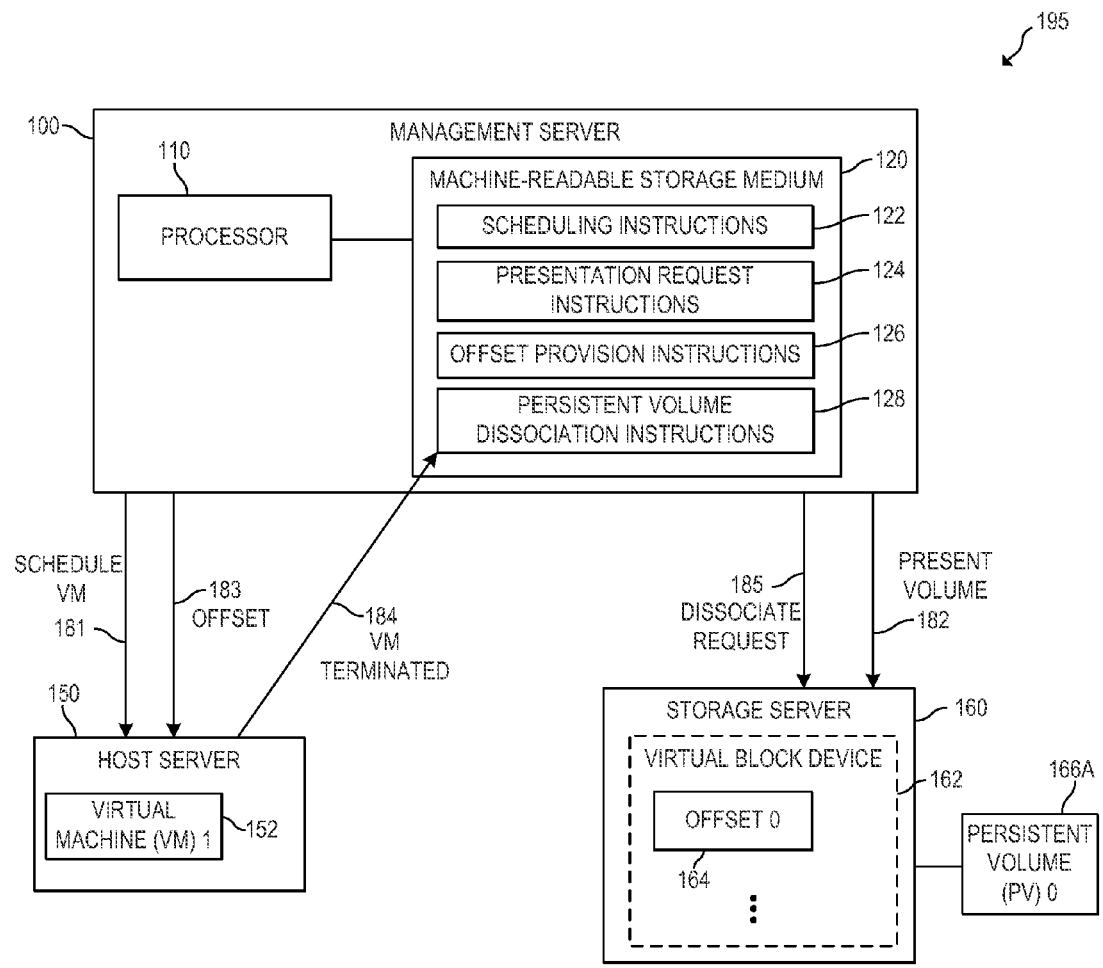
FIG. 1 is a block diagram of an example system to dissociate a persistent volume from a virtual block device of a storage server.

As noted above, a computing device may access remote storage managed by a separate storage server. For example, an enterprise offering cloud computing services to consumers may implement a cloud computing system including a plurality of host servers and a plurality of storage servers. A host server may host at least one virtual machine, and each storage server may manage at least one physical storage device. The storage servers may present the storage of these physical devices as logical units or volumes, each of which may include storage from at least one of the physical devices. Some of the logical volumes may be allocated as persistent volumes, each maintaining stored information for a respective virtual machine regardless of the state of the virtual machine. A host server may access a persistent volume associated with a virtual machine hosted thereon through the storage server managing the persistent volume.

In some examples, a consumer's virtual machine may be scheduled to run on any one of the plurality of host servers depending on, for example, host server availability, load balancing, server maintenance, and the like. In such examples, the consumer's virtual machine should be able to access its persistent volumes, managed by at least one of the storage servers, regardless of which host server is hosting (e.g., running) the virtual machine. As such, each host server may be granted access to each storage server. In such examples, the host servers may limit virtual machine access to storage at the storage servers. For example, the host server may prevent a virtual machine hosted thereon from accessing any storage at the storage servers other than persistent volumes associated with the virtual machine.

However, a virtual machine hosted at a host server may circumvent such limitations imposed by the host server by exploiting vulnerabilities at the host server, for example. In this manner, a virtual machine may obtain full or partial control of the host server. Such a rogue virtual machine may then access any storage managed by any of the storage servers, since the host server on which it is running has access to all of the storage managed by each storage server. To limit such access to logical volumes managed by a storage server, an authentication key may be assigned to each logical volume managed by a storage sever in some examples. However, such examples add the complexity of managing a database of the authentication keys to the cloud computing system. Additionally, this database may be an additional point of attack within the cloud computing system that, if compromised, would provide the information needed to access the logical volumes.

To address these issues, in examples described herein a storage server may provide no path for performing input/output (I/O) operations at a persistent volume managed by the storage server unless the persistent volume is presently desired for access by its associated virtual machine. In such examples, persistent volumes not presently in use may be rendered inaccessible to host servers to thereby render them inaccessible to a rogue virtual machine.

In examples described herein, a storage server may provide access to persistent volumes indirectly via a virtual block device at the storage server. In such examples, persistent volumes at the storage server may be accessible for input/output (I/O) operations by a host server if mapped to an offset of the virtual block device, and inaccessible if not mapped to an offset of the virtual block device. In some examples, a host server may host a virtual machine associated with a persistent volume managed by a storage server. In such examples, the persistent volume may be mapped to an offset of a virtual block device of the storage server to provide the host server I/O access to the persistent volume. Additionally, in examples described herein, the storage server may dissociate (e.g., unmap) the persistent volume from the virtual block device in response to termination of the virtual machine.

In this manner, examples described herein may render a persistent volume inaccessible to a host server if it is not currently desired for I/O access by its associated virtual machine. Such examples may prevent a rogue virtual machine at a host server from accessing any persistent volume not currently mapped to a virtual block device at a storage server. In this manner, examples described herein may limit the number of persistent volumes vulnerable to access by a rogue virtual machine to those in use at the time of the rogue virtual machine's activities.

Additionally, in some examples, a system manager may generate security information in response to a determination to make a persistent volume available to a host server. In such examples, the security information may be provided to the storage server to associate with a virtual block device to which the persistent volume is to be mapped, provided to the host server to access the virtual block device, and then discarded by the storage server. In this manner, examples described herein may limit access to a virtual block device to a particular host server without maintaining any key storage database, which may be vulnerable to attack. In such examples, a rogue virtual machine at a host server may be prevented from accessing any unmapped persistent volume and any persistent volume mapped to a virtual block device associated with another host server. Additionally, examples described herein may provide the above security features without securing each persistent volume individually by, for example, providing and managing security information for each persistent volume individually.

Referring now to the drawings, FIG. 1 is a block diagram of an example system 195 to dissociate a persistent volume from a virtual block device of a storage server. In the example of FIG. 1, system 195 includes a management server 100, a host server 150, and a storage server 160. Any management server described herein may be, for example, a computing device such as a web server, a database server, a Local Area Network (LAN) server, or any other server or computing device suitable for managing at least a portion of a computing system including at least one host server for hosting at least one virtual machine and at least one storage server to interact with the at least one host server.

In the example of FIG. 1, management server 100 includes a processor 110 and a machine-readable storage medium 120 including instructions 122, 124, 126, and 128. In some examples, storage medium 120 may include additional instructions. In other examples, instructions 122, 124, 126, 128, and any other instructions described herein in relation to storage medium 120 may be stored remotely from management server 100. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processor 110 may fetch, decode, and execute instructions stored on storage medium 120 to implement the functionalities described below. In other examples, the functionality of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage device to contain or store information such as executable instructions, data, and the like. For example, any machine-readable storage medium described herein may be any of Random Access Memory (RAM), flash memory, a storage drive (e.g., a hard disk), a Compact Disc Read Only Memory (CD-ROM), and the like, or a combination thereof. Further, any machine-readable storage medium described herein may be non-transitory.

Machine-readable storage medium 120 includes instructions 122 for scheduling at least one virtual machine on a host server. Any host server described herein may be, for example, a computing device such as a web server, a database server, a LAN server, or any other server or computing device suitable for hosting at least one virtual machine and communicating with other servers via at least one network. As used herein, a network may be, for example, a computer network, telephone network, or a combination thereof. In some examples, suitable computer networks include, for example, a LAN, a wireless local area network (WLAN), a wide area network (WAN), an enterprise private network, a virtual private network (VPN), the Internet, and the like.

Additionally, any virtual machine described herein may be, for example, a resource generated by the execution of machine-readable instructions on a physical computing device platform and capable of performing functions of a physical computing device, such as the execution of machine-readable instructions, performing I/O operations, etc. Any virtual machine described herein may be able to, for example, execute an operating system, execute multiple applications, execute multiple applications within an operating system executed by the virtual machine, or a combination thereof. In some examples, host server 150 may include a hypervisor to manage the execution of a plurality of virtual machines on host server 150.

In the example of FIG. 1, instructions 122 may schedule at least a virtual machine 152 on host sever 150. In some examples, instructions 122 may schedule virtual machine 152 on host server 150 by at least providing a virtual machine scheduling communication 181 to host server 150. Communication 181 may be, for example, a request that host server 150 host virtual machine 152. Information needed by host server 150 to host virtual machine 152 may be provided by management server 100 in communication 181 or separately. In some examples, instructions 122 may schedule virtual machine 152 in response to a request to schedule virtual machine 152 received from a user of system 195, such as a user to whom virtual machine 152 is assigned.

In the example of FIG. 1, presentation request instructions 124 may request that a storage server present a persistent volume to a host server, such as the host server on which instructions 122 scheduled the virtual machine. Any storage server described herein may be, for example, a computing device such as a web server, a database server, a LAN server, or any other server or computing device suitable for providing a host server access to storage via at least one network. In some examples, instructions 124 may provide a volume presentation request 182 to storage server 160 to request that storage server 160 present, to host server 150, a persistent volume 166A managed by storage server 160. In some examples, instructions 124 may request presentation of the persistent volume in response to a request to attach the persistent volume at a virtual machine received from a user of system 195, such as a user to whom the virtual machine is assigned.

Storage server 160 may manage at least one physical storage device. In some examples, storage server 160 may manage the storage provided by its physical storage devices as logical units or volumes, each of which may include storage from at least one of the physical devices. For example, a logical volume may include all of the storage of a physical device, some of the storage of a physical device, some or all of the storage of multiple physical devices, or a combination thereof. Input/output (I/O) operations (e.g., read operations, write operations, etc.) may be performed at the logical volumes by entities in communication with storage server 160, such as host server 150. Additionally, physical storage devices managed by a storage server may be located at the storage server, presented to the storage by a separate storage controller, or both. Physical storage devices described herein may be, for example, any type of memory or other electronic circuitry for storing data in any suitable format. In some examples, a physical storage device may be at least one of a hard disk drive, a solid state drive, a tape drive, and the like, or a combination thereof.

Additionally, storage server 160 may manage at least one of the logical volumes as a persistent volume associated with a virtual machine. As used herein, a "persistent volume" is a logical volume of storage to store information for a virtual machine regardless of a state of the virtual machine. In examples described herein, the states of a virtual machine may include, for example, a running state in which the virtual machine is running on a host server, an inactive state in which the virtual machine is not running on any host server (e.g., after termination of the virtual machine), or any other operational, transitional, or inactive state of the virtual machine, or the like.

As used herein, a persistent volume "associated with" a virtual machine is a persistent volume allocated to store information for the virtual machine regardless of the state of the virtual machine. In examples described herein, a persistent volume associated with a virtual machine may maintain information stored at the persistent volume by the virtual machine while the virtual machine is running, while the virtual machine is not running (e.g., inactive), and during any transitional state of the virtual machine. As used herein, a virtual machine "associated with" a persistent volume is a virtual machine permitted to store information on and read information from the persistent volume. In some examples, storage server 160 may implement block storage at each of the persistent volumes managed by storage server 160, such that block level I/O operations may be performed at each of the persistent volumes.

In the example of FIG. 1, in response to a request 182 from management server 100, storage server 160 may map a persistent volume to an offset of a virtual block device of storage server 160. As used herein, a "virtual block device" may be an access control module defining an address space into which physical and logical units of storage may be mapped at respective offsets, and that may route a received request for an I/O operation to a unit of storage mapped to an offset specified in the I/O operation request. Any virtual block device described herein may be implemented, for example, in the form of executable instructions encoded on a machine-readable storage medium, in the form of electronic circuitry, or a combination thereof. In some examples, a virtual block device may receive and route block level I/O operations. Additionally, as used herein, a "virtual block device offset" may be an offset in the address space of a virtual block device.

In examples described herein, persistent volumes managed by a storage server are inaccessible by host servers by default. In such examples, storage servers may allow I/O operations at persistent volumes to be made through virtual block devices exclusively. For example, a persistent volume may not be accessible for I/O operations by any host server until the persistent volume is mapped to an offset of a virtual block device of the storage server. Once mapped to a virtual block device, a host server that has attached the virtual block device may perform I/O operations at the persistent volume via I/O operations at target offsets of the virtual block device, wherein the target offsets are based on the offset to which the persistent volume is mapped. Additionally, the storage server may unmap or otherwise dissociate the persistent volume from the virtual block device. Once the persistent volume is dissociated from a virtual block device, a host server having access to the virtual block device will no longer have I/O access to the persistent volume. If a persistent volume is not mapped to any virtual block device of a storage server, then the persistent volume is inaccessible to all host servers.

In some examples, each persistent volume (or other logical volume) mapped to a virtual block device may be mapped to at least one range of offsets of the virtual block device. In some examples, the range of offsets to which a persistent volume is mapped may be maintained in the virtual block device by storing a boundary offset representing one boundary of the range (e.g., a lower boundary) and the size of the persistent volume. In other examples, the mapping of any persistent volume to a virtual block device may be fragmented. For example, two or more portions of the persistent volume may be mapped to two or more non-contiguous ranges of offsets in the virtual block device.

A virtual block device of a storage server may receive a request for an I/O operation at a target offset of the virtual block device. As used herein, a "target offset" is an offset of a virtual block device specified, in a request for an I/O operation, as the location at which to perform the requested I/O operation at the virtual block device. In response to the request, the virtual block device may route the I/O operation request to the persistent volume mapped to the virtual block device at the target offset. For example, in response to an I/O operation request, the virtual block device may request or perform an I/O operation at an appropriate offset of the persistent volume mapped to the target offset of the virtual block device. The virtual block device may determine the appropriate offset of the persistent volume based on the target offset and the mapping of the persistent volume to offsets of the virtual block device. In some examples, the I/O operation requests received and processed by the virtual block device may be block level I/O operation requests. In such examples, the virtual block device may process a block level I/O operation request by requesting a block level I/O operation at the appropriate offset of a persistent volume.

In some examples, storage server 160 may present its virtual block devices to host servers of system 195. For example, storage server 160 may present virtual block devices to host servers as attachable units of storage. Each attachable unit may be attached by at least one host server. Once an attachable unit is attached at a host server, the host server is able to request I/O operations at offsets of a virtual block device associated with the attachable unit by requesting I/O operations at the attachable unit. In some examples, each attachable unit may be assigned identification information that may be used by a host server to perform I/O operations at the attachable unit. For example, the identification information may be a logical unit number (LUN), a LUN in combination with other hierarchical information (e.g., information identifying a target entity associated with the LUN on the storage server), or the like. In such examples, each attachable unit may be referred to as a LUN. In some examples, the virtual block devices of a storage server may each be attached by one respective host server exclusively.

In the example of FIG. 1, virtual machine 152 scheduled on host server 150 by instructions 122 is associated with persistent volume 166A managed by storage server 160. In such examples, instructions 124 may provide, to storage server 160, a request 182 to present persistent volume 166A to host server 150. In response, storage server 160 may map persistent volume 166A to an available offset 164 of a virtual block device 162. In some examples, the offset to which persistent volume 166A is mapped may be a boundary offset, as described above.

In some examples, storage server 160 may map persistent volume 166A to an offset 164 of virtual block device 162 attached at host server 150 in response to request 182 to present persistent volume 166A to host server 150. In other examples, if no virtual block device of storage server 160 is attached at host server 150, then, in response to request 182, storage server 160 may create virtual block device 162 to be attached by host server 150 and then map persistent volume 166A to offset 164. In some examples, instructions 124 may specify the offset to which persistent volume 166A is to be mapped. The offset may be included in request 182. In other examples, storage server 160 may determine the offset in response to request 182 and provide the offset to management server 100.

In examples described herein, host servers may communicate with storage servers to discover and attach virtual block devices of the storage servers. For example, host server 150 may communicate with storage server 160 to discover identification information (e.g., a LUN) assigned to virtual block device 162, which host server 150 may use to attach and access virtual block device 162. In such examples, management server 100 may provide host server 150 additional information (e.g., security information) that host server 150 may use to attach virtual block device 162.

In the example of FIG. 1, offset provision instructions 126 may provide to host server 150 the offset 164 at which persistent volume 166A is mapped to virtual block device 162. Instructions 126 may provide offset 164 to host server 150 via an offset communication 183. In some examples, communication 183 may include multiple offsets, as well as other information regarding persistent volume 166A, such as the size of persistent volume 166A, and the like. Alternatively, this additional information may be provided separately. In some examples, offset 164 may be the offset of virtual block device 162 at which persistent volume 166A is accessible for I/O operations by host server 150. For example, host server 150 may request an I/O operation at persistent volume 166A by requesting an I/O operation at a target offset of virtual block device 162, wherein the target offset is based on the received offset 164. Host server 150 may request such I/O operations in response to requests from virtual machines hosted thereon. In other examples, instructions 126 may provide, to host server 150, offset information useable by host server to retrieve offset 164 from, for example, storage server 160 or a database separate from host server 150.

In some examples, host server 150 may present virtual machines hosted thereon with virtual disks representing remotely managed persistent volumes. The virtual disks may be presented such that the virtual machines may recognize and interact with virtual disks as if they were local physical block storage devices. In some examples, host server 150 may create a virtual disk based on information received in an offset communication 183, such as the size and offset of a persistent volume. In such examples, a virtual machine may attach a virtual disk representing an associated persistent volume. As used herein, to "attach" a persistent volume at a virtual machine is to attach a virtual disk representing the persistent volume at the virtual machine. Similarly, a persistent volume referred to as "attached" at a virtual machine means that a virtual disk representing the persistent volume is attached at the virtual machine.

In some examples, management server 100 may indicate to host server 150 which virtual machine may attach a particular persistent volume. For example, management server 100 may indicate, in offset communication 183 or separately, that virtual machine 152 may attach the persistent volume at the offset 164 (i.e., persistent volume 166A). In such examples, host server 150 may allow virtual machine 152 to attach a virtual disk representing persistent volume 166A. Virtual machine 152 may then request an I/O operation at its persistent volume by requesting I/O operations at the attached virtual disk representing the persistent volume. In response to such a request, host server 150 may request an I/O operation at persistent volume 166A by requesting an I/O operation at a target offset of virtual block device 162, where the target offset is based on offset 164. A request from a virtual machine to access a virtual disk may be provided by a virtual machine to a virtual disk directly, or through at least one intervening component or layer that may process, reroute, or modify the initial request, or do a combination thereof.

In some examples, a request made by a host server 150 for an I/O operation at a target offset of virtual block device 162 may be a request for any type of I/O operation, such as a read operation, a write operation, or the like. Such a request may be, for example, a request for a block level I/O operation. Additionally, any I/O operation request described herein that is provided to a storage server may be provided using, for example, the Internet Small Computer System Interface (iSCSI) protocol, the advanced technology attachment (ATA) over Ethernet (AOE) protocol, or any other protocol suitable for providing storage device I/O operation requests over a network.

In the example of FIG. 1, persistent volume dissociation instructions 128 may request that a storage server dissociate a persistent volume from a virtual block device in response to the termination of a virtual machine associated with the persistent volume. For example, host server 150 may terminate virtual machine 152 and provide management server a communication 184 confirming the termination of virtual machine 152. In some examples, virtual machine 152 may be terminated in response to a request from a user of system 195, such as a user to whom virtual machine 152 is assigned. In such examples, the user may provide the request to management server 100, which may instruct host server 150 to terminate virtual machine 152. In other examples, virtual machine 152 may terminate for other reasons, and host server 150 may provide communication 184 after the termination.

In the example of FIG. 1, in response to communication 184 indicating that virtual machine 152 has terminated, instructions 128 may provide a request 185 to storage server 160 to request that storage server 160 dissociate persistent volume 166A from virtual block device 162. As used herein, to "dissociate" a persistent volume (or another logical volume) from a virtual block device is to remove or alter information stored at the virtual block device such that the persistent volume is not accessible via the virtual block device. For example, dissociating a persistent volume from a virtual block device may include deleting or altering information that may be used by the virtual block device to route an I/O operation to the persistent volume. In some examples, dissociating a persistent volume from a virtual block device may include unmapping the persistent volume from the virtual block device. In such examples, unmapping the persistent volume may include removing information associating the persistent volume to any offsets of the virtual block device, or otherwise altering such information such that persistent volume is not accessible via any offset of the virtual block device.

Examples described herein may render a persistent volume inaccessible to a host server in response to the termination of a virtual machine associated with the persistent volume. In this manner, examples described herein may maintain persistent volumes associated with inactive virtual machines inaccessible to host servers. Accordingly, such examples may protect inactive persistent volumes from unauthorized access by severing the path used to access the persistent volume once the virtual machine authorized to access the persistent volume is terminated.

Figure 2:
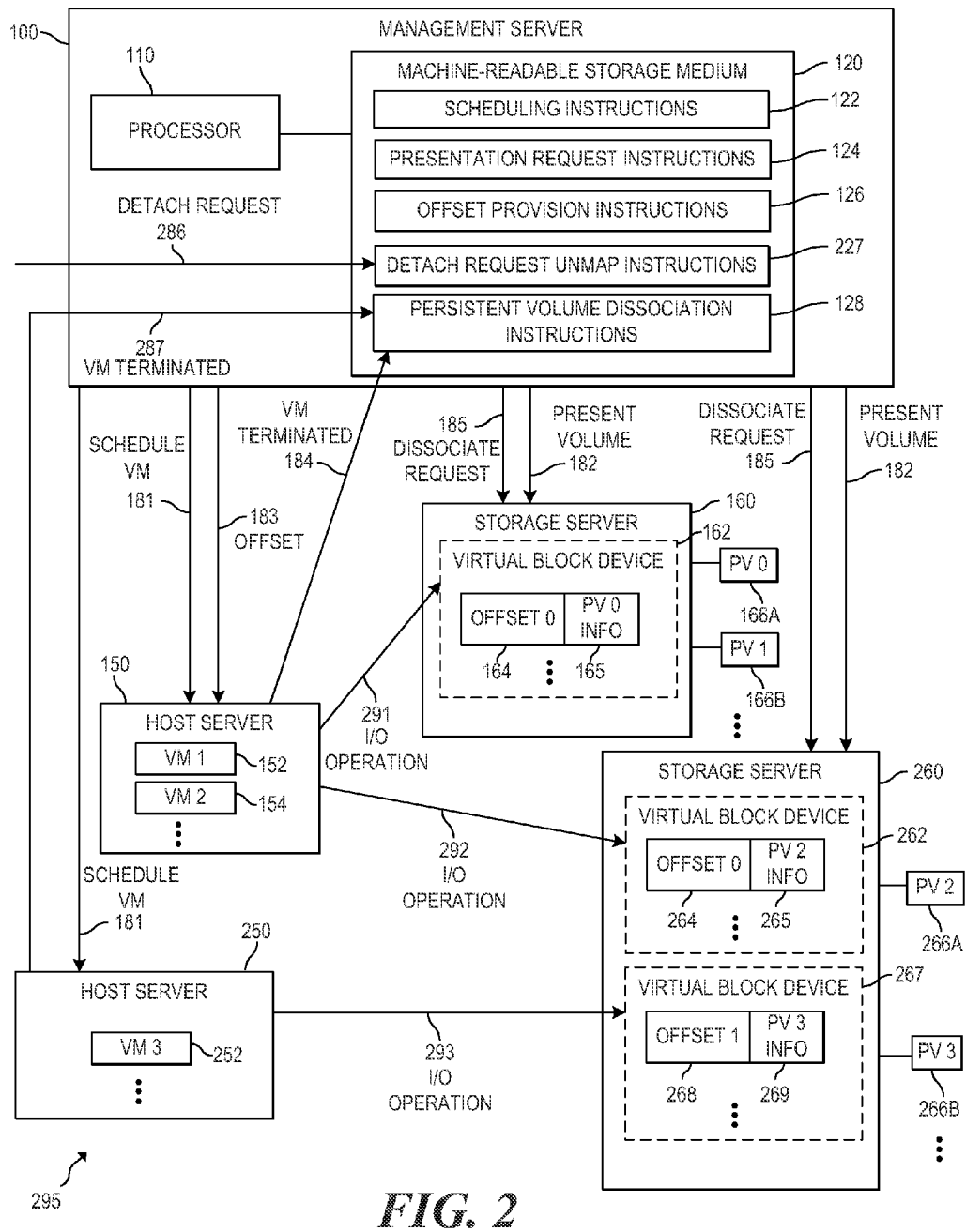
FIG. 2 is a block diagram of an example system including a management server to request that persistent volumes be unmapped from virtual block devices of storage servers.

FIG. 2 is a block diagram of an example system 295 including a management server to request that persistent volumes be unmapped from virtual block devices of storage servers. In the example of FIG. 2, system 295 may include a management server 100, a host server 150, and a storage server 160, as described above in relation to FIG. 1. In the example of FIG. 2, storage server 160 may manage a plurality of persistent volumes including, for example, persistent volumes 166A and 166B. In some examples, system 295 may also include a host server 250 and a storage server 260. In other examples, system 295 may include more than two storage servers, more than two host servers, or both. Management server 100 may include a processor 110 and a machine-readable storage medium 120, including instructions 122, 124, 126, and 128, as described above in relation to FIG. 1. In the example of FIG. 2, storage medium 120 further includes instructions 227.

As described above in relation to FIG. 1, instructions 122 may schedule at least one virtual machine on host server 150.

In the example of FIG. 2, instructions 122 may schedule at least virtual machines 152 and 154 on host server 150 via communications 181. In some examples, virtual machine 152 may be associated with persistent volume 166A, and instructions 124 may request, via a presentation request 182, that storage server 160 present persistent volume 166A to host server 150. In response, storage server 160 may map persistent volume 166A to an available offset 164 of virtual block device 162, as described above in relation to FIG. 1.

In the example of FIG. 2, each virtual block device offset to which a persistent volume is mapped is associated with persistent volume information for the persistent volume mapped to that offset. For example, offset 164 is associated with persistent volume information 165 associated with persistent volume 166A. In some examples described herein, persistent volume information may include the size of the associated persistent volume, information that may be used to route an I/O operation request to the associated persistent volume, and the like, or a combination thereof.

In some examples, host server 150 may attach virtual block device 162, as described above in relation to FIG. 1. Additionally, instructions 126 may provide an offset 164 to host server 150 via an offset communication 183. In such examples, after attaching virtual block device 162, host server 150 may request an I/O operation at persistent volume 166A mapped to offset 164 by providing to storage server 160 a request 291 for an I/O operation at a target offset of virtual block device 162. In such examples, the target offset may be based on offset 164. In some examples, host server 150 may provide a request 291 to storage server 160 in response to a request, from a virtual machine, for an I/O operation at a virtual disk of host server 150, as described above in relation to FIG. 1. In some examples, the virtual disk may represent a persistent volume associated with the virtual machine. In other examples, instructions 126 may provide, to host server 150, offset information useable by host server to retrieve offset 164 from, for example, storage server 160 or a database separate from host server 150.

In the example of FIG. 2, storage medium 120 further includes instructions 227 to request that a storage server unmap a persistent volume from a virtual block device in response to a request 286 to detach the persistent volume from a first virtual machine. For example, if persistent volume 166A is attached at virtual machine 152, instructions 227 may receive a request 286 to detach persistent volume 166A from virtual machine 152. In some examples, request 286 may be received from a user of system 295, such as a user of virtual machine 152. In response to request 286, instructions 227 may provide a request 185 to storage server 160 to request that storage server 160 unmap persistent volume 166A from virtual block device 162. Storage server 160 may unmap or otherwise dissociate persistent volume 166A from virtual block device 162 in response to the request 185. In some examples, instructions 227 may request the unmapping of persistent volume 166A, in response to the request 286 to detach persistent volume 166A from virtual machine 152, if persistent volume 166A is not attached to any other virtual machine (e.g., virtual machine 154, etc.) hosted by host server 150 at the time of the request 286 to detach persistent volume 166A. By unmapping a persistent volume in response to a request to detach the persistent volume, examples described herein may maintain persistent volumes inaccessible to host servers when they are not currently desired by an associated virtual machine. Accordingly, such examples may protect persistent volumes that are not in current use from unauthorized access by severing the path used to access the persistent volume in response to a request to detach the persistent volume.

As described above in relation to FIG. 1, instructions 128 may request, via a request 185, that storage server 160 dissociate persistent volume 166A, associated with virtual machine 152, from virtual block device 162 in response to the termination of virtual machine 152. In some examples, instructions 128 may provide request 185 in response to an indication 184 from host server 150 that virtual machine 152 has terminated. In the example of FIG. 2, instructions 128 may request, via request 185, that storage server 160 unmap persistent volume 166A, in response to indication 184 that virtual machine 152 has terminated, if persistent volume 166A is not attached to any other virtual machine hosted by host server 150 at the time of the indication 184. For example, instructions 128 may not provide request 185 if persistent volume 166A is attached to virtual machine 154 at the time of indication 184 that virtual machine 152 has terminated. In some examples, management server 100 may track which persistent volumes are attached to which virtual machines and use this information to determine whether a persistent volume is attached to more than one virtual machine.

In the example of FIG. 2, instructions 128 may further request, in response to the termination of a virtual machine, that a storage server dissociate from a virtual block device of the storage server each persistent volume managed by the storage server, attached to the virtual machine prior to the termination, and not attached to any other virtual machine hosted at the host server at the time of an indication of the virtual machine termination. For example, host server 150 may indicate to management server 100 that virtual machine 152 has terminated via an indication 184. In response to indication 184, instructions 128 may request that storage server 160 dissociate from virtual block device 162 each persistent volume managed by storage server 160, attached to virtual machine 152 prior to the termination, and not attached to any other virtual machine hosted at host server 150 at the time of indication 184. For example, if persistent volumes 166A and 166B were attached to virtual machine 152 prior to its termination, instructions 128 may request, via at least one request 185, that storage server 160 dissociate persistent volumes 166A and 166B from virtual block device 162 in response to indication 184. In other examples, if persistent volume 166B were also attached to virtual machine 154, for example, prior to the termination of virtual machine 152, then instructions 128 may request that persistent volume 166A be dissociated, but not persistent volume 166B.

In the example of FIG. 2, storage server 260 may manage at least one physical storage device, which may be located at the storage server, presented to the storage by a separate storage controller, or a combination thereof. In some examples, storage server 260 may manage the storage provided by its physical devices as logical units or volumes, each of which may include storage from at least one of the physical devices, as described above in relation to storage server 160. Additionally, storage server 260 may manage at least one of the logical volumes as a persistent volume associated with a virtual machine, as described above in relation to storage server 160. In the example of FIG. 2, storage server 260 may manage at least persistent volumes 266A and 266B.

In the example of FIG. 2, instructions 124 may request that storage server 260 present a persistent volume to a host server, as described above in relation to storage server 160. For example, instructions 124 may provide a volume presentation request 182 to storage server 260 to request that storage server 260 present to host server 150 persistent volume 266A managed by storage server 260. In some examples, persistent volume 266A may be associated with a virtual machine hosted at host server 150, such as virtual machine 152. Instructions 124 may request presentation of the persistent volume in response to, for example, a request to attach the persistent volume received from a user of system 295, such as a user to whom virtual machine 152 is assigned.

In response to a request 182, storage server 260 may map a persistent volume to an offset of a virtual block device of storage server 260. For example, in response to a request 182 to present persistent volume 266A to host server 150, storage server 260 may map persistent volume 266A to an available offset 264 of a virtual block device 262 attached at host server 150. Offset 264 may be associated with persistent volume information 265 for persistent volume 266A. In other examples, if no virtual block device of storage server 260 is attached at host server 150, then, in response to request 182, storage server 260 may create virtual block device 262 to be attached by host server 150 and then map persistent volume 266A to offset 264. In some examples, instructions 124 may specify the offset to which persistent volume 266A is to be mapped. Alternatively, storage server 260 may determine the offset and provide it to management server 100.

In some examples, host server 150 may communicate with storage server 260 to discover and attach virtual block device 262, as described above in relation to storage server 160. In such examples, after attaching virtual block device 262, host server 150 may request I/O operations at a persistent volume mapped to virtual block device 262. In the example of FIG. 2, host server 150 may request an I/O operation at persistent volume 266A mapped to offset 264 by providing to storage server 260 a request 292 for an I/O operation at a target offset of virtual block device 262. In such examples, the target offset may be based on offset 264 received from management server 100 via an offset communication 183 or retrieved from storage server 260 or another database using offset information. In some examples, instructions 126 may provide the offset 264 to host server 150 via the communication 183. In other examples, instructions 126 may provide, to host server 250, offset information useable by host server to retrieve offset 264 from, for example, storage server 260 or a database separate from host server 250.

In the example of FIG. 2, instructions 128 may request that storage server 260 dissociate a persistent volume from a virtual block device in response to the termination of a virtual machine. For example, instructions 128 may provide to storage server 260 a request 185 that storage server 260 dissociate persistent volume 266A, associated with virtual machine 152, from virtual block device 262 in response to the termination of virtual machine 152, indicated by a communication 184.

In some examples, in response to the termination of a virtual machine, instructions 128 may request that multiple storage servers dissociate persistent volumes from respective virtual block devices. For example, virtual machine 152 hosted at host server 150 may be associated with persistent volumes 166A and 266A. In such examples, in response to an indication 184 of the termination of virtual machine 152, instructions 128 may request that storage server 160 dissociate persistent volume 166A from virtual block device 162, and request that storage server 260 dissociate persistent volume 266A from virtual block device 262. In this manner, examples described herein may maintain persistent volumes associated with inactive virtual machines inaccessible to host servers.

In the example of FIG. 2, host server 250 may host at least one virtual machine. In some examples, host server 250 may include a hypervisor to manage the execution of a plurality of virtual machines on host server 250. Host server 250 may also allow virtual machines hosted thereon to attach persistent volumes via virtual disks as described above in relation to host server 150. In the example of FIG. 2, instructions 122 may schedule at least one virtual machine on host server 250. For example, instructions 122 may provide, to host server 250, at least one virtual machine scheduling communication 181 to schedule at least virtual machine 252 on host server 250.

In the example of FIG. 2, instructions 124 may provide a volume presentation request 182 to storage server 260 to request that storage server 260 present to host server 250 a persistent volume 266B. In some examples, persistent volume 266B may be associated with virtual machine 252 hosted at host server 250. In response to a request 182, storage server 260 may map persistent volume 266B to an offset of a virtual block device of storage server 260, as described above in relation to storage server 160. In some examples, a storage server may provide separate virtual block devices for different host servers. For example, storage server 260 may create a virtual block device 262 to be attached by host server 150 and create a virtual block device 267 to be attached by host server 250. In such examples, storage server 260 may present persistent volumes to host server 150 by mapping them to virtual block device 262 and may present persistent volumes to host server 250 by mapping them to virtual block device 267.

In the example of FIG. 2, in response to a request 182 to present persistent volume 266B to host server 250, storage server 260 may map persistent volume 266B to an available offset 268 of a virtual block device 267 attached at host server 250. Offset 268 may be associated with persistent volume information 269 for persistent volume 266B. In other examples, if no virtual block device of storage server 260 is attached at host server 250, then, in response to request 182, storage server 260 may create virtual block device 267 to be attached by host server 250 and then map persistent volume 266B to offset 268.

In some examples, offset 268 may be specified by instructions 124 or determined by storage server 260. In examples in which management server 100 (e.g., instructions 124) specifies offsets, persistent volumes of system 295 may be mapped to virtual block device offsets in a globally exclusive manner such that no more than one persistent volume is mapped to a particular offset across all virtual block devices and storage servers. For example, while a given persistent volume is mapped to an offset "0" of a virtual block device of a storage server, no other persistent volume may be mapped to offset "0" of any other virtual block device either on the same or a different storage server. In the example of FIG. 2, for example, the offsets of virtual block device 162 to which persistent volumes of storage server 160 are mapped may each be different from the offsets of virtual block devices 262 and 267 to which persistent volumes of storage server 260 are mapped. Additionally, instructions 126 may further provide to host server 250, via a communication 183, the offset 268 at which persistent volume 266B is mapped to virtual block device 267 of storage server 260.

In some examples, host server 250 may communicate with storage server 260 to discover and attach virtual block device 267, as described above in relation to storage server 150. In such examples, after attaching virtual block device 267, host server 250 may request I/O operations at a persistent volume mapped to virtual block device 267. In the example of FIG. 2, host server 250 may request an I/O operation at persistent volume 266B mapped to offset 268 by providing to storage server 260 a request 293 for an I/O operation at a target offset of virtual block device 267. In such examples, the target offset may be based on offset 268 received via an offset communication 183 provided to host server 250.

Instructions 128 may request that storage server 260 dissociate a persistent volume from a virtual block device in response to the termination of a virtual machine hosted at host server 250. For example, instructions 128 may provide to storage server 260 a request 185 that storage server 260 dissociate persistent volume 266B, associated with virtual machine 252, from virtual block device 267 in response to the termination of virtual machine 252. In some examples, instructions 128 may provide the request 185 to storage server 260 in response to an indication 287 from host server 250 that virtual machine 252 has terminated.

In some examples, communications between management server 100 and the host servers and storage servers of system 295 may be provided using out-of-band communication. Such communications may include, for example, communications 181, 182, 183, 184, 185, and 287. For example, out-of-band communications between management server 100 and a host or storage server may be communications provided via a protocol different than the protocol used by the host and storage servers for I/O operation communications (e.g., iSCSI, AOE, etc.). In some examples, at least some of such out-of-band communications may be provided over a different network than the I/O operation communications. Additionally, in some examples, the communications between management server 100 and the host and storage servers may be encrypted. In some examples, functionalities described herein in relation to FIGS. 1-2 may be provided in combination with functionalities described herein in relation to any of FIGS. 3-5.

Figure 3:
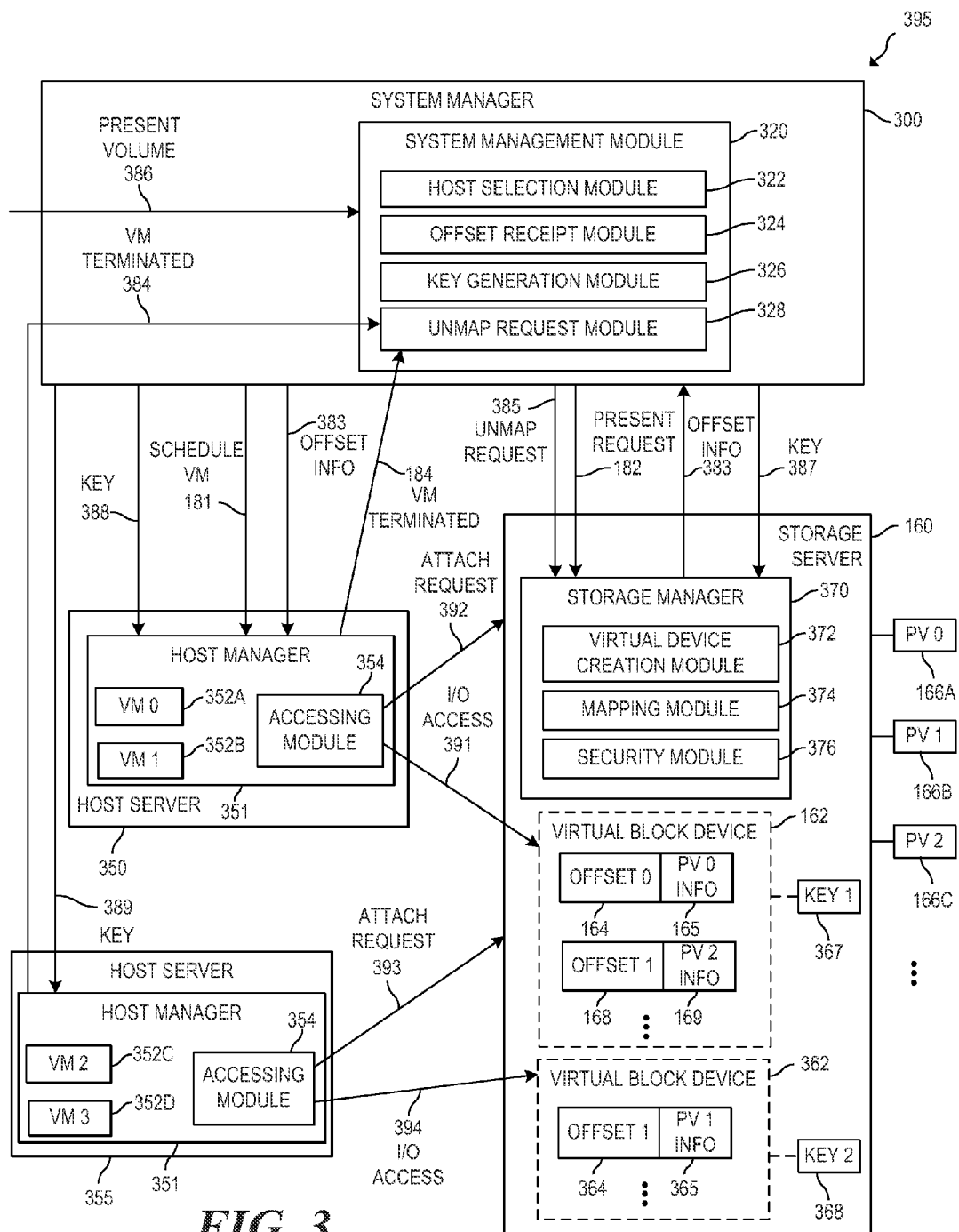
FIG. 3 is a block diagram of an example system including a storage server to unmap a persistent volume presented to a host server via a virtual block device.

FIG. 3 is a block diagram of an example system 395 including a storage server to unmap a persistent volume presented to a host server via a virtual block device. In the example of FIG. 3, system 395 comprises a system manager 300 including a system management module 320 that may include modules 322, 324, 326, and 328. In other examples, module 320 may include additional modules. In some examples, the functionalities of modules 320, 322, 324, 326, and 328 are implemented in the form of executable instructions encoded on a machine-readable storage medium. In other examples, the functionalities of modules 320, 322, 324, 326, and 328 are implemented in the form of electronic circuitry. In other examples, the functionalities of modules 320, 322, 324, 326, and 328 are implemented as a combination of executable instructions and electronic circuitry.

In the example of FIG. 3, system 395 includes a plurality of host servers, including at least host servers 350 and 355. Each of host servers 350 and 355 comprises a host manager 351 including an accessing module 354. In other examples, host manager 351 may include additional modules. System 395 further includes a storage server 160, which may manage a plurality of persistent volumes, as described above in relation to FIG. 1. Storage server 160 may manage at least persistent volumes 166A, 166B, and 166C, for example. In the example of FIG. 3, storage server 160 includes a storage manager 370 including modules 372, 374, and 376. In other examples, storage manager 370 may include additional modules. In some examples, the functionalities of host manager 351, storage manager 370, and modules 354, 372, 374, and 376 may each be implemented in the form of executable instructions encoded on a machine-readable storage medium, in the form of electronic circuitry, or a combination thereof. Additionally, system 395 may include a plurality of storage servers.

In some examples, system manager 300 may be implemented on a management server separate from the host servers and storage servers of system 395. For example, system manager 300 may be implemented on a management server, such as management server 100 described above in relation to FIG. 1. In such examples, the functionalities of modules 320, 322, 324, 326, and 328 may be implemented in the form of instructions encoded on a machine-readable storage medium and executable by processor 110, in the form of electronic circuitry, or a combination thereof. In other examples, system manager 300 may be implemented on one of the host or storage servers, or may be implemented in a distributed manner on two or more of the host and storage servers of system 395. For example, system manager 300 may be implemented at least in part on each of at least one of the host servers, at least in part on each of at least one of the storage servers, or a combination thereof. In such examples, the functionalities of modules 320, 322, 324, 326, and 328 may be implemented in the form of executable instructions encoded on at least one machine-readable storage medium of at least one host or storage server, in the form of electronic circuitry of at least one host or storage server, or a combination thereof.

Host selection module 322 of system management module 320 may select one of the plurality of host servers of system 395 to host a virtual machine associated with a persistent volume managed by a storage server of system 395. In some examples, module 322 may select one of the host servers based on factors such as the availability of resources on each host server, load balancing, and the like, or a combination thereof. In the example of FIG. 3, module 322 may select host server 350 to host a virtual machine 352A associated with a persistent volume 166A managed by storage server 160. After selecting host server 350, module 322 may schedule virtual machine 352A on host server 350 by providing to host manager 351 of host server 350 a scheduling communication 181, as described above in relation to FIG. 1.

In response to the communication 181, host manger 351 of host server 350 may host virtual machine 352A. In some examples, host manager 351 of host servers 350 and 355 may each host at least one virtual machine. For example, host manager 351 of host server 350 may host at least virtual machines 352A and 352B, and host manager 351 of host server 355 may host at least virtual machines 352C and 352D. In some examples, host manager 351 of host servers 350 and 355 may each include a hypervisor to manage the execution of a plurality of virtual machines.

In some examples, module 322 may also determine to make a persistent volume managed by a storage server available to a host server. For example, in response to a request 386 to present a persistent volume 166A to virtual machine 352A hosted at host server 350, module 322 may determine to make persistent volume 166A available to host server 350 for I/O operations. In some examples, the request 386 may be received from a user of system 395, such as a user of the virtual machine associated with the persistent volume. In response to a determination to make persistent volume 166A available to host server 350 for I/O operations, module 322 may provide a request 182 that storage manager 370 make persistent volume 166A available to host server 350 for I/O operations.

In response to request 182, mapping module 374 may map persistent volume 166A to an available offset 164 of a virtual block device 162 attached at host server 350. Offset 164 may be associated with persistent volume information 165 for persistent volume 166A. Offset 164 may be referred to herein as a mapped offset. As used herein, a "mapped offset" may be an offset of a virtual block device to which a persistent volume is mapped. In other examples, if no virtual block device of storage server 160 is attached at host server 350, then, in response to the request 182, virtual block device creation module 372 may create virtual block device 162 to be attached by host server 350. After the creation of virtual block device 162, module 374 may map persistent volume 166A to an available offset 164 of the created virtual block device 162.

In some examples, mapping module 374 of storage server 160 may determine the offset 164 and provide offset information 383 associated with mapped offset 164 to system manager 300. In such examples, offset receipt module 324 may receive offset information 383 from module 374 of storage manager 370 and provide the offset information 383 to host manager 351 of host server 350. As used herein, "offset information" associated with an offset of a virtual block device of a storage server may be the offset itself or other information useable by a host server to retrieve the offset from storage external to the host server. For example, the offset information may include reference information (e.g., an address) indicating where the host server may retrieve the offset from the storage server or a database separate from the storage server. In some examples, host manager 351 may use offset information 383 to retrieve offset 164 from storage server 160 or a separate database, for example. In other examples, storage manager 370 may provide mapped offset 164 to host server 350, without providing offset 164 or offset information 383 to system manager 300. In other examples, module 322 of system manager 300 may specify the offset 164 to which persistent volume 166A is to be mapped and may provide the offset to host manager 351 of host server 350 as offset information 383. In such examples, module 322 may map persistent volumes to offsets in a globally exclusive manner, as described above in relation to FIG. 2. In the example of FIG. 3, offset 164 is an offset at which persistent volume 166A is accessible to virtual machine 352A via an I/O operation of host server 350. In some examples, other persistent volumes of storage server 160 may also be mapped to offsets of virtual block device 162. For example, persistent volume 166C may be mapped to an offset 168. In some examples, offset 168 may be associated with persistent volume information 169 for persistent volume 166C.

In the example of FIG. 3, accessing module 354 of host server 350 may request an I/O operation at a persistent volume made available by storage server 160 by providing to storage server 160 a request 391 for an I/O operation at a target offset of a virtual block device of storage server 160. For example, module 354 may request an I/O operation at persistent volume 166A mapped to offset 164 by providing to storage server 160 a request 391 for an I/O operation at a target offset of virtual block device 162. In such examples, the target offset may be based on offset 164 received in or retrieved using offset information 383. In some examples, module 354 may present virtual disks to the virtual machines hosted by host manager 351 of host server 350, as described above in relation to FIG. 1. In such examples, module 354 may request an I/O operation at a target offset of a virtual block device in response to a request from a virtual machine for an I/O operation at one of the virtual disks. In some examples, I/O operation requests 391 may be provided via the iSCSI protocol, the AOE protocol, or any other protocol suitable for providing storage device I/O operation requests over a network.

In some examples, in response to an indication that a virtual machine associated with a persistent volume has terminated, unmap request module 328 may request that a storage manager unmap the persistent volume from a virtual block device such that the persistent volume is unavailable for I/O operations by the host server formerly hosting the virtual machine. For example, in response to an indication 184 from host manager 351 of host server 350 that virtual machine 352A has terminated, module 328 may request that storage manager 370 unmap persistent volume 166A from virtual block device 162 such that persistent volume 166A is unavailable for I/O operations by host server 350. In some examples, module 328 may provide storage manager 370 a request 385 to unmap or otherwise dissociate the persistent volume from the virtual block device.

In the example of FIG. 3, unmapping persistent volume 166A from virtual block device 162 may render persistent volume 166A unavailable for I/O operations by host server 350. In such examples, storage manager 370 may allow I/O operations at persistent volumes managed by storage server 160 to be made exclusively through virtual block devices of storage server 160. Additionally, in some examples, a storage server may provide one virtual block device for each host server desiring access to a persistent volume of the storage server. For example, host server 350 may be permitted by storage server 160 to attach virtual block device 162, but no other virtual block devices of storage server 160. In such examples, unmapping persistent volume 166A from virtual block device 162 attached at host server 350 may render persistent volume 166A unavailable for I/O operations by host server 350. In this manner, examples described herein may maintain persistent volumes associated with inactive virtual machines inaccessible to host servers.

In some examples, each virtual block device of system 395 may be associated with security information to prevent host servers not having the security information from attaching the virtual block device. In such examples, the security information may be used to limit which host servers may request I/O operations at a particular virtual block device. In some examples, each virtual block device may be associated with one host server of system 395. In such examples, the security information associated with the virtual block device may be known to the associated host server exclusively so that no other host server may attach or perform I/O operations at the virtual block device.

In some examples, the security information may be generated dynamically at the time of the creation of the virtual block device. In the example of FIG. 3, a key generation module 326 may generate a security key in response to a determination to make a persistent volume available to a host server if no virtual block device of the storage server managing the persistent volume is attached at the host server. For example, if no virtual block device of storage server 160 is attached at host server 350 when module 322 determines to make persistent volume 166A available to host server 350, then module 326 may generate a security key 367 for a virtual block device to be attached at host server 350. As used herein, a security key may be a bit pattern or any other type of information. In some examples, module 326 may generate at least a portion of the information forming the security key randomly, pseudo-randomly, or by any other process whereby the generated information may not be readily predicted outside of module 326.

After security key 367 is generated, module 322 may provide security key 367 to storage manager 370 and host manager 351 of host server 350. In some examples, module 322 may provide security key 367 to storage manager 370 in a request 182 to present a persistent volume to host server 350. In other examples, module 322 may provide security key 367 to storage manager 370 in a communication 387 separate from request 182. Module 322 may provide security key 367 to host manager 351 via a communication 388. Additionally, system management module 320 may discard security key 367 if security key 367 has been provided to storage server 160 and host manager 351. In such examples, module 320 may discard security key 367 in response to receiving acknowledgements from storage server 160 and host manager 351 of host server 350 that they have each received key 367. In some examples, by discarding security key 367 after providing it to storage server 160 and host manager 351, examples described herein may provide security for persistent volumes without maintaining a database of security information that may be compromised. In some examples, communications 387 and 388 may be provided via a protocol different than a protocol (e.g., iSCSI, AOE, etc.) used by the host and storage servers for I/O operation communications such as I/O operation requests 391.

In other examples, security key 367 may be generated by host manager 351 of host server 350. In such examples, host manager 351 may provide the generated security key 367 to storage manager 370 via a protocol different than a protocol used by the host and storage server for I/O operation communications. Additionally, in such examples, module 326 of system manager 300 may request that host manager 351 generate the security key in response to determining that no virtual block device is attached at host server 350, as described above. In the example of FIG. 3, module 372 may create a virtual block device in response to a request 182, as described above. For example, module 372 may create virtual block device 162 in response to a request 182 to present a persistent volume to host server 350 if no virtual block device of storage server 160 is attached at host server 350. In some examples, module 372 may further associate the security key 367 received from system manager 300 or host manager 351 with virtual block device 162 for host server 350.

In some examples, host manager 351 of host server 350 may attach virtual block device 162 by at least providing security key 367 to storage manager 370. For example, accessing module 354 of host server 350 may provide storage server 160 with a request 392 to attach a virtual block device. In some examples, the request 392 may include security key 367. In other examples, host manager 351 may provide security key 367 to storage server 160 separately from request 392. In response to request 392 and security key 367, security module 376 of storage manager 370 may permit host server 350 to attach a virtual block device associated with security key 367, which is virtual block device 162 in the example of FIG. 3. Security module 376 may further prevent any host server from attaching a virtual block device of storage server 160 if the host server does not provide the security key associated with the virtual block device. In some examples, requests 392 and security keys provided for virtual block device attachment may be provided via the same protocol used for I/O operations requests 391, such as iSCSI, AOE, and the like. In the example of FIG. 3, after host server 350 attaches virtual block device 162, host server 350 may request an I/O operation at any persistent volume mapped to virtual block device 162 by requesting an I/O operation at an appropriate target offset of virtual block device 162. In such examples, any of the plurality of persistent volumes managed by storage server 160 and not mapped to an offset of virtual block device 162 is inaccessible to host server 350.

In the example of FIG. 3, host selection module 322 may further select host server 355 to host at least virtual machines 352C and 352D, which module 322 may schedule on host server 355. In such examples, virtual machines 352C and 352D may be hosted by host manager 351 of host server 355. After scheduling the virtual machines, module 322 may receive a request 386 to attach a persistent volume 166B to virtual machine 352C. In response, module 322 may determine to make persistent volume 166B available to host server 355 hosting virtual machine 352C. If no virtual block device of storage server 160 is attached at host server 355, then, in response to the determination to present persistent volume 166B, module 326 may generate a security key 368 different than security key 367. In other examples, host manager 351 of host server 355 may generate security key 368, in response to the determination by module 326, for example.

After security key 368 is generated, module 322 may request, via a request 182, that storage manager 370 present persistent volume 166B to host server 355, and may provide security key 368 to storage manager 370 with the request 182 or via a separate communication 387. Module 322 may also provide security key 368 to host server 355 via a communication 389. In other examples, host manager 351 of host server 355 may provide security key 368 to storage manager 370, as described above in relation to host server 350. In response to the request 182, module 372 may create virtual block device 362 and associate security key 368 with virtual block device 362. Module 374 may then map persistent volume 166B to an available offset 364 of virtual block device 362. Offset 364 may be associated with persistent volume information 365 for persistent volume 166B. Storage manager 370 may provide offset information 383 to system manager 300, which may provide the offset information 383 to host server 355. In some examples, offset information 383 may include offset 364 or information useable to retrieve offset 364. In other examples, storage manager 370 may provide offset 364 to host manager 351 of host server 355 without providing it to system manager 300.

In some examples, accessing module 354 of host server 355 may attach virtual block device 362 via a request 393 using security key 368, as described above in relation to host server 350. In such examples, accessing module 354 may further request an I/O operation at persistent volume 166B via a request 394 for an I/O operation at a target offset of virtual block device 362, where the target offset is based on the received offset 364.

In the example of FIG. 3, host manager 351 of host server 355 may also provide a communication 384 to system manager 300 to indicate that virtual machine 352C has terminated. In response to the communication 384, module 328 may request that storage manager 370 unmap persistent volume 166B associated with virtual machine 352C from virtual block device 362. In the example of FIG. 3, any persistent volume managed by storage server 160 that is not mapped to an offset of virtual block device 362 is unavailable for I/O operations by host server 355.

In some examples, communications between system manager 300 and the host managers and storage managers of system 395 may be provided using out-of-band communication. Such communication may include, for example, communications 181, 182, 183, 184, 185, 383, 384, 385, 387, 388, and 389. For example, out-of-band communications between system manager 300 and a host or storage manager may be communications provided via a protocol different than the protocol used by the host and storage servers for I/O operation communications (e.g., iSCSI, AOE, etc.). Additionally, in some examples, the communications between system manager 300 and a host or storage manager may be encrypted. In some examples, functionalities described herein in relation to FIG. 3 may be provided in combination with functionalities described herein in relation to any of FIGS. 1-2 and 4-5.

Figure 4:
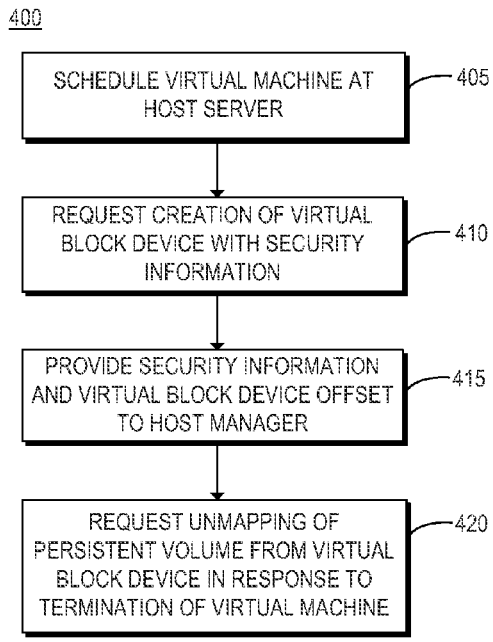
FIG. 4 is a flowchart of an example method for unmapping a persistent volume from a virtual block device.

FIG. 4 is a flowchart of an example method 400 for unmapping a persistent volume from a virtual block device. Although execution of method 400 is described below with reference to system 395 of FIG. 3, other suitable components for execution of method 400 can be utilized (e.g., system 195 or 295). Additionally, method 400 may be implemented in the form of executable instructions encoded on a machine-readable storage medium, in the form of electronic circuitry, or a combination thereof.

At 405 of method 400, system manager 300 may schedule a virtual machine at a host server. In some examples, the virtual machine may be associated with a persistent volume managed by a storage server. In such examples, the persistent volume may store information for the scheduled virtual machine regardless of whether the virtual machine is running. For example, system manager 300 may schedule virtual machine 352A, associated with persistent volume 166A, at host server 350.

At 410, after scheduling virtual machine 352A, system manager 300 may provide to storage manager 370 of storage server 160 a request to create a virtual block device associated with security information at storage server 160. In some examples, a request 182 to make persistent volume 166A available for I/O operations to host server 350 may be treated by storage manager 370 as a request to create a virtual block device if no virtual block device of storage server 160 is attached at host server 350. In response to the request, storage manager 370 may create virtual block device 162 associated with security information, such as security key 367. Storage manager 370 may further map persistent volume 166A to an available offset 164 of virtual block device 162.

At 415, system manager 300 may provide, to a host manager 351 of host server 350, the security information associated with virtual block device 162 and the offset 164 at which persistent volume 166A is mapped to virtual block device 162. In other examples, storage manager 370 may provide offset 164 to the host manager 351 without providing it to system manager 300. At 420, in response to an indication that virtual machine 352A has terminated, system manager 300 may provide, to storage manager 370, a request to unmap persistent volume 166A associated with virtual machine 352A from virtual block device 162 to render persistent volume 166A unavailable for I/O operations by host server 350.

Figure 5:
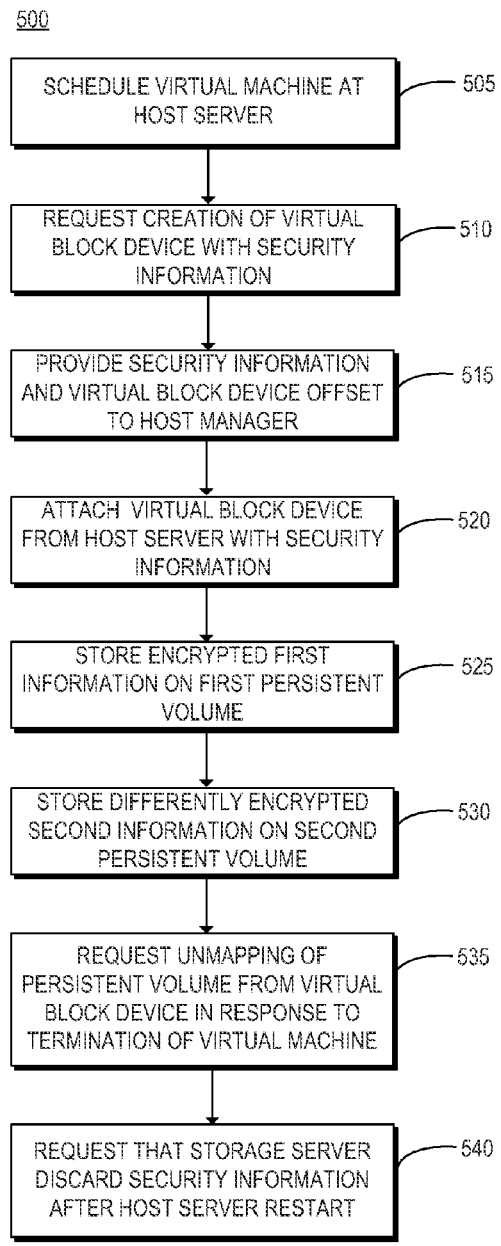
FIG. 5 is a flowchart of an example method for unmapping a persistent volume in response to termination of a virtual machine.

FIG. 5 is a flowchart of an example method 500 for unmapping a persistent volume in response to termination of a virtual machine. Although execution of method 500 is described below with reference to system 395 of FIG. 3, other suitable components for execution of method 500 can be utilized (e.g., system 195 or 295). Additionally, method 500 may be implemented in the form of executable instructions encoded on a machine-readable storage medium, in the form of electronic circuitry, or a combination thereof.

At 505 of method 500, system manager 300 may schedule, at a host server, a virtual machine associated with a persistent volume that may store information for the scheduled virtual machine regardless of whether the virtual machine is running. In some examples, system manager 300 may schedule virtual machine 352A, associated with persistent volume 166A, at host server 350. In some examples, system manager 300 may also schedule at host server 350 a second virtual machine 352B associated with a persistent volume 166C.

At 510, after scheduling virtual machine 352A, system manager 300 may provide to storage manager 370 of storage server 160 a request to create a virtual block device associated with security information at storage server 160. In some examples, if no virtual block device of storage server 160 is attached at host server 350, then a request 182 to make persistent volume 166A available for I/O operations to host server 350 may be treated by storage manager 370 as a request to create a virtual block device. In response to the request, storage manager 370 may create virtual block device 162 associated with security information, such as security key 367. Storage manager 370 may further map persistent volume 166A to an available offset 164 of virtual block device 162 and map persistent volume 166B to an available offset 168.

At 515 of method 500, system manager 300 may provide, to a host manager 351 of host server 350, the security information associated with virtual block device 162. Also at 515, storage manager 370 may provide, to host manager 351 of host server 350, offset 164 at which persistent volume 166A is mapped to virtual block device 162. In such examples, storage manager 370 may provide offset 164 to the host manager 351 without providing it to system manager 300. In other examples, storage manager 370 may provide offset information associated with offset 164 to host manager 351 via system manager 300. At 520, accessing module 354 of host server 350 may attach virtual block device 162 at host server 350 with the received security information (e.g., security key 367), as described above in relation to FIG. 3. After attaching virtual block device 162, host server may perform I/O operations at persistent volumes mapped to virtual block device 162. At 525, virtual machine 352A may store encrypted information on persistent volume 166A. For example, virtual machine 352A may request to write encrypted information to a virtual disk representing persistent volume 166A on host server 350. In response, accessing module 354 of host server 350 may write the encrypted information to persistent volume 166A by requesting at least one write operation 391 at a target offset of virtual block device 162, where the target offset is based on offset 164.

In some examples, host manager 351 of host server 350 may also host a virtual machine 352B associated with a persistent volume 166C mapped to offset 168 of virtual block device 162. In such examples, virtual machine 352B may attach a virtual disk presented by accessing module 354 of host server 350, where the virtual disk represents persistent volume 166B. At 530, virtual machine 352B may store encrypted information on persistent volume 166B. For example, virtual machine 352B may request to write encrypted information to a virtual disk representing persistent volume 166B on host server 350. In response, accessing module 354 of host server 350 may write the encrypted information to persistent volume 166B by requesting at least one write operation 391 at a target offset of virtual block device 162, where the target offset is based on offset 168. In some examples, the information stored by virtual machine 352B may be encrypted differently than the encrypted information stored by virtual machine 352A. For example, the information stored by virtual machines 352A and 352B may be encrypted using different encryption processes, different encryption keys, or the like, or a combination thereof. In examples described herein, virtual machines storing differently encrypted information on their respective persistent volumes may provide additional security for the persistent volumes. For example, even if a rogue virtual machine gains access to a persistent volume associated with another virtual machine, the encryption of the information may prevent the rogue virtual machine from determining the content of the information.

At 535, in response to an indication that virtual machine 352A has terminated, system manager 300 may provide, to storage manager 370, a request to unmap persistent volume 166A associated with virtual machine 352A from virtual block device 162 to render persistent volume 166A unavailable for I/O operations by host server 350. Additionally, at 540, after a restart of host server 350, host server 350 may request that storage server 160 discard the security information associated with virtual block device 162. In such examples, system manager 300 may generate new security information with which the restarted host server may attach a virtual block device of a storage server.

What is claimed is:

1. A non-transitory machine-readable storage medium encoded with instructions executable by a processor of a management server, the storage medium comprising:
   instructions to schedule a first virtual machine on a first host server;
   instructions to request that a first storage server present to the first host server a first persistent volume, the first persistent volume to store information for the first virtual machine regardless of the state of the first virtual machine;
   instructions to provide, to the first host server, an offset of a first virtual block device of the first storage server at which the first persistent volume is accessible to the first virtual machine via an input/output (I/O) operation of the first host server based on the offset; and
   instructions to request that the first storage server dissociate the first persistent volume from the first virtual block device in response to termination of the first virtual machine.

2. The storage medium of claim 1, further comprising:
   instructions to request that the first storage server unmap the first persistent volume from the first virtual block device in response to a request to detach the first persistent volume from the first virtual machine, if the first persistent volume is not attached to any other virtual machine hosted by the host server at the time of the request to detach.

3. The storage medium of claim 1, wherein the instructions to request that the first storage server dissociate the first persistent volume comprise instructions to request that the first storage server unmap the first persistent volume from the first virtual block device, in response to an indication that the first virtual machine has terminated, if the first persistent volume is not attached to any other virtual machine hosted by the host server at the time of the termination indication.

4. The storage medium of claim 1, wherein the instructions to request that the first storage server dissociate the first persistent volume comprise instructions to request, in response to the termination, that the first storage server dissociate from the first virtual block device each persistent volume managed by the first storage server, attached to the first virtual machine prior to the termination, and not attached to any other virtual machine hosted at the host server at the time of an indication of the termination.

5. The storage medium of claim 1, wherein:
   the instructions to request that the first storage server present the first persistent volume comprise instructions to request that a second storage server present to the first host server a second persistent volume associated with the first virtual machine;
   the instructions to provide comprise instructions to provide, to the first host server, an offset at which the second persistent volume is mapped to a second virtual block device of the second storage server, and
   the instructions to request that the first storage server dissociate the first persistent volume comprise instructions to request that the second storage server dissociate the second persistent volume from the second virtual block device in response to the termination of the first virtual machine.

6. The storage medium of claim 5, wherein:
   the instructions to schedule comprise instructions to schedule a second virtual machine on a second host server;
   the instructions to request that the first storage server present the first persistent volume comprise instructions to request that the second storage server present to the second host server a third persistent volume associated with the second virtual machine;
   the instructions to provide comprise instructions to provide, to the second host server, an offset at which the third persistent volume is mapped to a third virtual block device of the second storage server; and
   the instructions to request that the first storage server dissociate the first persistent volume comprise instructions to request that the second storage server dissociate the third persistent volume from the third virtual block device in response to termination of the second virtual machine.

7. A system comprising:
   a system manager to:
      select a first host server among a plurality of host servers to host a first virtual machine associated with a first persistent volume managed by a storage server;
      request that a storage manager of the storage server make the first persistent volume available to the selected first host server for input/output (I/O) operations;
      receive, from the storage manager, offset information associated with a mapped offset of a first virtual block device of the first storage server at which the first persistent volume is accessible to the first virtual machine via an I/O operation of the first host server; and
      request that the storage manager unmap the first persistent volume from the first virtual block device such that the first persistent volume is unavailable for I/O operations by the first host server, in response to an indication that the first virtual machine has terminated.

8. The system of claim 7, wherein the system manager is further to:
   generate a first security key in response to a determination to make available the first persistent volume to the selected first host server, if no virtual block device of the storage server is attached at the selected first host server;
   provide the first security key to the storage manager of the storage server and a host manager of the selected first host server; and
   discard the first security key if the first security key has been provided to the storage server and the selected first host server.

9. The system of claim 8, wherein the system manager is further to:
   generate a second security key, different than the first security key, in response to a determination to make available a second persistent volume managed by the storage server to a second host server of the plurality of host servers, if no virtual block device of the storage server is attached at the second host server;
   provide the second security key to the storage server with a request to generate a second virtual block device; and
   provide the second security key to the second host server;
   wherein the first and second security keys are provided via a first communication protocol different than a second communication protocol used by the host server to request an I/O operation at a target offset of the first virtual block device.

10. The system of claim 7, further comprising:
    the storage server, wherein the storage manager is to:
       create the first virtual block device; and associate the first virtual block device with a security key;

wherein the system manager is implemented at least in part on the storage server.

11. The system of claim 10, further comprising:

the first host server, comprising a host manager to:
- attach the first virtual block device, associated with the security key, by at least providing the security key to the storage manager; and
- request an I/O operation at a target offset of the first virtual block device to request an I/O operation at the first persistent volume, wherein the target offset is based on the mapped offset, wherein the system manager is implemented in part on the host server.

12. The system of claim 11, wherein:

the host manager is further to generate the first security key;

the storage server is to manage a plurality of persistent volumes, including the first persistent volume; and any of the plurality of persistent volumes not mapped to an offset of the first virtual block device is inaccessible to the first host server.

13. A method comprising:

scheduling, at a host server, a first virtual machine associated with a first persistent volume to store information for the first virtual machine regardless of whether the first virtual machine is running;

providing, to a storage manager of the storage server, a request to create a virtual block device, associated with security information, at the storage server after scheduling the first virtual machine;

providing, to a host manager of the host server, the security information and a first offset at which the persistent volume is mapped to the virtual block device; and providing, to the storage manager, a request to unmap the first persistent volume from the virtual block device to render the first persistent volume unavailable for I/O operations by the first host server, in response to an indication that the first virtual machine has terminated.

14. The method of claim 13, further comprising:

attaching the virtual block device at the first host server with the security information; and requesting that the storage server discard the security information associated with the virtual block device after a restart of the host server;

wherein the first offset is provided to the host manager by the storage manager without providing the first offset to a system manager.

15. The method of claim 13, further comprising:

storing encrypted first information on the first persistent volume with the first virtual machine; and storing encrypted second information on a second persistent volume mapped to a second offset of the virtual block device with a second virtual machine hosted by the host server, wherein the first information is encrypted differently than the second information.

* * * * *

UNITED STATES PATENT AND TRADEMARK OFFICE
CERTIFICATE OF CORRECTION

PATENT NO. : 9,098,325 B2
APPLICATION NO. : 13/407050
DATED : August 4, 2015
INVENTOR(S) : Timothy Reddin et al.

It is certified that error appears in the above-identified patent and that said Letters Patent is hereby corrected as shown below:

Title Page, Item (56) in OTHER PUBLICATIONS, Page 1, Line 1, delete "10" and insert -- IO --, therefor.

In the Claims

In column 21, line 58, in Claim 5, delete "server, and" and insert -- server; and --, therefor.

Signed and Sealed this
Twenty-first Day of June, 2016

Michelle K. Lee
*Director of the United States Patent and Trademark Office*